United States Patent

Harfenist

[11] 3,896,235
[45] July 22, 1975

[54] ANTHELMINTIC ETHERS AND COMPOSITION THEREOF

[75] Inventor: Morton Harfenist, Chapel Hill, N.C.

[73] Assignee: Burroughs Wellcome Co., Research Triangle Park, N.C.

[22] Filed: Aug. 25, 1971

[21] Appl. No.: 174,986

[30] Foreign Application Priority Data
Sept. 1, 1970   United Kingdom............... 41871/70
Sept. 1, 1970   United Kingdom............... 41872/70
July 23, 1971   United Kingdom............... 34668/71

[52] U.S. Cl.............................. 424/324; 424/340
[51] Int. Cl......................... A01n 9/20; A01n 1/24
[58] Field of Search................... 424/324, 339, 340;
260/562 A

[56] References Cited
UNITED STATES PATENTS
1,263,238    4/1918    Hartman........................ 260/562 A OTHER PUBLICATIONS
Chem. Abst. 54, 5528(e), (1960)–Ch'en et al. $\beta\beta'$-Bis(pacetamidophenoxy)diethylether.

Primary Examiner—Albert T. Meyers
Assistant Examiner—D. W. Robinson
Attorney, Agent, or Firm—Donald Brown

[57] ABSTRACT

Pharmaceutical formulations and their preparation, suitable for use in the treatment of liver fluke infections of mammals, of a compound of formula (I)

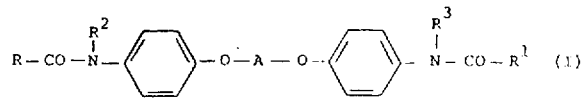

wherein R and $R^1$ are the same or different and each is hydrogen, an optionally substituted saturated aliphatic hydrocarbon group having 1 to 7 carbon atoms, or an unsaturated aliphatic hydrocarbon group having 2 to 4 carbon atoms, $R^2$ and $R^3$ are the same or different and each is hydrogen or a lower alkyl group having 1 to 4 carbon atoms, and A is $-CH_2-$, $-(CH_2)_2-$, $-CH_2-O-CH_2-$ or the group

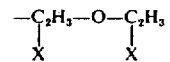

wherein X and $X^1$ are the same or different and each is hydrogen or an alkyl group having 1 to 3 carbon atoms.

Also provided are novel compounds within formula (I) and processes for their preparation.

58 Claims, No Drawings

ANTHELMINTIC ETHERS AND COMPOSITION THEREOF

This invention relates to ethers, their synthesis, formulations containing them, their use in the treatment of liver fluke infections in mammals.

Animals are infected with liver fluke when eating forage contaminated with encysted forms of cercariae, an intermediate stage in the life-cycle of the fluke. The cercariae emerge from the cysts in the intestine of the host animal, penetrate the intestine wall, and make their way to the liver. At this stage they are microscopic in size, but grow as they wander around the liver parenchyma. This causes considerable destruction of the liver tissue and can give rise to the syndrome of acute fascioliasis which normally leads to death of the host when massive infections are present. If the animal survives, the flukes eventually reach the bile ducts where they mature into the adult worms. The presence of a massive infection in the bile ducts gives rise to the syndrome of chronic fascioliasis which is a serious debilitating disease of the host animal. Hitherto liver fluke remedies have been known to kill only the adult and semi-adult worms, and the immature worms have been resistant to attack by such remedies.

It has now been found that the compounds of formula (I) are effective in combatting infections of liver flukes in mammals, and are especially active in combatting infections of immature worms of Fasciola spp.

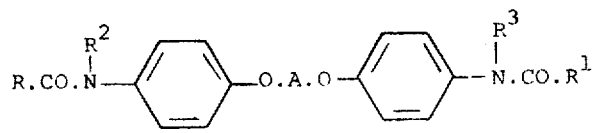

(I)

In formula (I), R and $R^1$ are the same or different and each is hydrogen, an optionally substituted saturated aliphatic hydrocarbon group having 1 to 7 carbon atoms, or an unsaturated aliphatic hydrocarbon group having 2 to 4 carbon atoms; $R^2$ and $R^3$ are the same or different and each is hydrogen or a lower alkyl group having 1 to 4 carbon atoms; and A is $-CH_2-$, $-(CH_2)_2-$, $-CH_2-O-CH_2-$, or the group

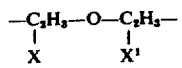

wherein X and $X^1$ are the same or different and each is hydrogen or an alkyl group having 1 to 3 carbon atoms.

When R or $R^1$ is a saturated aliphatic hydrocarbon group it may be substituted by a hydroxy group, an amino group, an N-alkylamino group, an N,N-dialkylamino group, or a carbonyl group for example an acyl group, the 'alkyl' and 'acyl' groups referred to above each having from 1 to 4 carbon atoms.

When R or $R^1$ is a saturated aliphatic hydrocarbon radical having more than two carbon atoms it may be a straight - chain or branched-chain alkyl group or a cyclic group such as a cycloalkyl group, but it is preferably a straight-chain (n-) alkyl group; when R or $R^1$ is an unsaturated aliphatic hydrocarbon group it is preferably an alkenyl group or an alkylalkenyl group, said groups preferably having one ethylenic linkage. A is preferably $-CH_2-$, $-CH_2-CH_2-O-CH_2.CH_2-$,

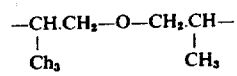

or

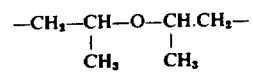

As a preferred subclass within formula (I) are those compounds wherein R and $R^1$ are the same or different and each is hydrogen or a saturated aliphatic hydrocarbon radical having 1 to 4 carbon atoms; $R^2$ and $R^3$ are both hydrogen; and A is the group

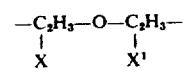

Wherein X and $X^1$ are the same or different and each is hydrogen or a methyl group.

It is believed that all the compounds of formula (I) are novel with the exceptions of those compounds wherein $R = R^1 =$ methyl and either $R^2 = R^3 = H$ when A is $-CH_2-$ or $-(CH_2)_2-$ or $R^2 = R^3 = H$ or methyl when A is $-CH_2.CH_2-O-CH_2.CH_2-$. These compounds have been previously disclosed in the chemical literature as intermediates for the synthesis of derivatives thereof, but no biological activity has been previously ascribed to the compounds (J. Chem. Soc., 1931, 1765-71; Beilstein's Handbuch der Organischen Chemie, 13, 464; and Chemical Abstracts, 1960, 54, 5528f).

It will be appreciated by persons skilled in the art that acid addition salts may be formed by those compounds of formula (I) wherein either or both of the groups R and $R^1$ are saturated aliphatic hydrocarbon groups substituted by an amino, N-alkylamino or N,N-dialkylamino group. Unless the context indicates otherwise, wherever in the following reference is made to compounds of formula (I) it should be understood that this term includes the acid addition salts of the compounds hereinabove defined.

The compounds of formula (I) have been found active against experimental infections of *Fasciola gigantica* in mice, infections of *Fasciola hepatica* in rabbits and in ruminants including sheep and cattle, and infections of *Fasciola gigantica* in calves.

The percentage kill of a liver fluke infection by a compound of formula (I) is of course dose dependent, and it has been found that the younger the worms, the lower is the dose required to combat the infection. Thus upon oral dosing of sheep infected with *F. hepatica*, a dose of 60 to 100 mg. of one of the known compounds of formula (I) (R = $R^1=CH_3$; $R^2=R^3=H$; A=$-CH_2-CH_2-O-CH_2.CH_2-$) per kilogram body weight provides a nearly complete eradication (90–100%) of flukes of 3 days to 6 weeks old. In most instances an oral dose of about 100 to 120 mg. of this same compound per kilogram is required to provide a nearly complete eradication of liver flukes of all ages, including adult worms of 9 weeks and older; and an oral dose of 80 to 120 mg. per kilogram typically gives a clearance of 85 to 95% even in cases of severe clinical infections. For the treatment of infections of adult worms alone an oral dose of this compound of between 100 and 120 mg. per kilogram provides a nearly complete eradication, although the dosage can be increased to a level of up to 200 mg. per kilogram if desired.

A dose of a compound of formula (I) may be followed by a second dose within about 4 weeks, but practical considerations would probably dictate its administration after about 5 to 8 weeks. In the case of very light liver fluke infections, the second dose may be delayed for as long as 8 weeks.

Since in the field, it must be assumed that animals are continually subject to reinfection, it is especially advantageous in practice to administer these lower doses regularly during the appropriate season at about 4 to 8 week intervals.

A compound of formula (I) may be used in the treatment of liver fluke infections in mammals including *F. hepatica* in ruminants including sheep, cattle, goat and buffalo, and in the pig and horse; and *F. gigantica* in ruminants including sheep and cattle. The compound is preferably administered orally at a dose between 40 and 200 mg. per kilogram. In general it has been found that a dose of 80 to 120 mg. per kilogram is required to combat infections of both the mature and immature worms, and a dose of 60 to 100 mg. per kilogram for immature infections.

A compound of formula (I) may be administered for the treatment of liver fluke infections as the raw chemical, but preferably as an ingredient of a pharmaceutical formulation which contains in addition one or more inert carrier materials commonly used in pharmaceutical formulations as a vehicle for the active ingredient. The preferred formulations are those suitable for oral administration, containing from 5 to 95% by weight of a compound of formula (I). If presented as the raw chemical, then a compound of formula (I) is preferably in the form of a powder.

In the context of the present invention, the qualification 'inert' means that the carrier is pharmaceutically acceptable to the host of the infection to which the formulation is administered.

The presentation of an active ingredient (namely, a compound of formula (I)) in a pharmaceutical formulation may be as discrete units, such as tablets, capsules or cachets, each containing a predetermined amount of the active ingredient; as a powder or granules; or as a solution or a suspension in an aqueous liquid, a non-aqueous liquid, or a water-in-oil liquid emulsion. The active ingredient may also be presented as a bolus, electuary or paste; in the feed or a feed supplement intended for the host animal; in pellets, salt licks or block licks which are especially suitable for large animals such as sheep and cattle.

The formulations may be made by any of the methods of pharmacy but all methods include the step of bringing into association by admixture the active ingredient with the carrier which constitutes one or more accessory ingredients. In general the formulations are prepared by uniformly and intimately bringing into association the active ingredient with liquid carriers or finely divided solid carriers or both, and then, if necessary, shaping the product into the desired formulation.

The formulations contain one or more of the usual accessory ingredients used to prepare anthelmintic formulations including: solid and liquid diluents (for example, lactose, sucrose, glucose, starches, dicalcium phosphate or calcium phosphate for tablets, granules, dispersible and wettable powders, cachets and capsules; arachis oil, olive oil, or ethyl oleate for soft capsules; water, or vegetable oil for aqueous and non-aqueous suspensions, emulsions, and pastes); binders (for example, starch, sugar, glucose, methyl cellulose, gum acacia, Irish moss or gelatin for granules and tablets); surface active agents (for example sodium lauryl sulphate, cetrimide or polyoxyethylene sorbitan monolaureate for tablets, powders and granules; sodium salt of an alkyl naphthalene sulphonic acid, sorbitan mono-oleate, ceto-stearyl alcohol and an emulsifier condensate of nonylphenol and ethylene oxide, for pastes and wettable powders); lubricating agents (for example liquid paraffin, talc, stearic acid, magnesium stearate or polyethylene glycol for tablets); dispersing agents (for example, disodium salt of the condensation product of naphthalene sulphonic acid and formaldehyde, and calcium lignin sulphonate for wettable powders, pastes and suspensions); gelling agents (for example colloidal clays, sulphuric esters of a polysaccharide for aqueous suspensions); suspending and thickening agents (for example gum tragacanth, xanthan gum, alginates, polyvinyl pyrrolidone, sodium carboxymethyl cellulose, and hydroxy-ethylcellulose for aqueous suspensions, aqueousbased pastes and wettable powders); and humectants (for example glycerine for water-based pastes); and other therapeutically acceptable accessory ingredients such as preservatives, buffers and antioxidants, which are known to be useful as carriers in such formulations.

A tablet may be prepared by compression or moulding, optionally with one or more accessory ingredients. Compressed tablets may be prepared by compressing in a suitable machine the active ingredient in a free flowing form such as a powder or granules, optionally mixed with a binder, lubricant, inert diluent, lubricating, surface active or dispersing agent. Moulded tablets may be made by moulding in a suitable machine, a mixture of the powdered compound moistened with an inert liquid diluent. Conveniently each tablet contains from 0.5g. to 4.0g. of the active ingredient.

Granules may be made by the technique of wet granulation comprising moistening the powdered active ingredient with a binder in an inert liquid, and drying the moist mass; or by the techniques of precompression or slugging. The granules may be administered to animals in an inert liquid vehicle; or in a cachet or capsule of hard or soft gelatin preferably with a liquid or powdered solid diluent; or in a suspension with a water or an oil base. In a drench or suspension, it is preferably to include further accessory ingredients such as a dispersing agent.

A dispersible or wettable powder may be made by admixing together the finely divided active ingredient with a wetting agent, and then administering the powder to the host animal as a suspension or dispersion in water. If desired a dispersing, suspending or thickening agent may be included. These formulations preferably contain from about 15 to 85% by weight of the active ingredient.

A paste may be formulated in a liquid diluent which suspends the active ingredient. A stiffening or thickening agent may be included, together with a wetting agent and an humectant if the liquid diluent is water. If an emulsion paste is needed (oil-out or water-out), then one or more surface active agents should be included. From about 25 to 80% by weight of these paste formulations may be comprised of the active ingredient but if the lower concentrations are used, then sufficient stiffening or thickening agent should be included to provide the desired viscosity.

Suspensions of the active ingredient in an inert liquid carrier are essentially the same as pastes but of a lower viscosity. They may be formulated using water or other inert diluent as the liquid carrier in association with a dispersing or wetting agent. Other ingredients such as thickening, gelling and suspending agents may also be included. These formulations may contain a wide range of concentrations of active ingredient, but of course, if too high a concentration is included the viscosity of the formulation will increase and the formulation will become more of a paste than a suspension. Subject therefore to the concentration of the remaining ingredients, about 5 to 50% by weight of the formulations may be comprised by the active ingredient.

In feed supplements, the active ingredient is generally present in large amounts relative to the accessory ingredients, and the supplements may be added directly or after intermediate blending or dilution. Examples of accessory ingredients for such formulations include solid orally ingestible carriers such as corn meal, attapulgite clay, soya flour, wheat shorts, soya grits, edible vegetable materials, and fermentation residues. The active ingredient is usually incorporated in one or more of the accessory ingredients and intimately and uniformly dispersed by grinding, tumbling or stirring with conventional apparatus. Formulations containing about 1 to 90% by weight of the active ingredient are especially suitable for adding to feeds to provide a concentration desired to control infections by way of the animals' rations.

A compound of formula (I) may be administered either alone as the sole treatment for a liver fluke infection, or in combination with other substances which may complement or supplement its activity. Such additional substances may be administered simultaneously as a separate dose or in combination with a compound of formula (I) in a formulation, and may comprise other anthelmintics having activity against other parasites, such as cestodes (tapeworms) or nematodes. Such additional substances include phenothiazine; piperazine derivatives, for example the citrate, adipate or phosphate salts; organo-phosphorus compounds for example O,O-di-(2-chloroethyl) O-(3-chloro-4-methylcoumarin-7-yl)phosphate (Haloxon); 4-t-butyl-2-chlorophenyl N-methyl O-methylphosphoramidate (Ruelene (Trade Name)); O,O-diethyl O-(3-chloro-4-methyl-7-coumarinyl)phosphorothioate (Coumaphos); O,O-diethyl O-naphthaloximide phosphate (Naphthalophos); O,O-dimethyl 2,2,2-trichloro-1-hydroxyethylphosphonate (Trichlorfon); benzimidazole anthelmintics including 2-(4-thiazolyl)benzimidazole (Thiabendazole);methyl 5-n-butyl benzimidazole -2-carbamate (Parbendazole); and isopropyl 2-(4-thiazolyl)benzimidazole-5-carbamate (Cambendazole); quaternary ammonium anthelmintics including N-benzyl-N, N-dimethyl-N-(2-phenoxyethyl)ammonium salts such as the 3-hydroxy-2-naphthoate and embonate salts (Bephenium salts); N, N-dialkyl-4-alkoxy-α-naphthamidine anthelmintics including N,N-dibutyl-4-hexyloxy-α-naphthamidine (Bunamidine); dl-and 1-2,3,5,6-tetrahydro-6-phenylimidazo (2,1-b) thiazole salts (Tetramisole); trans-1-methyl-2-[2- (2-thienyl)vinyl]-1,4,5,6-tetrahydropyrimidine tartrate (Pyrantel tartrate); cis-1,4,5,6-tetrahydro-1-methyl-2-[2- (3-methyl-2-thienyl)vinyl]pyrimidine tartrate (Morantel tartrate); polyhalogenated benzanilide anthelmintics including 3,3',5,5',6-pentachloro-2,2'-dihydroxybenzanilide (Oxyclozanide); 2-acetoxy-4'-chloro-3, 5-diiodobenzanilide (Clioxanide); 3,4',5-tribromosalicylanilide (Tribromsalan); 3,5-diiode-3'-chloro-4'-(p-chlorophenoxy)salicylanilide (Rafoxanide); 5-bromo-2-hydroxy-4'-bromobenzanilide; 2,2'-dihydroxy-3,3'-dinitro-5,5'-dichloro-biphenyl (Menichlopholan); 2,2'-dihydroxy-3,3',5,5', 6,6'-hexachlorodiphenylmethane (Hexachlorophene); 1,4-bis (trichloro-methyl) benzene (Hetol); 3-iodo-4-hydroxy-5-nitrobenzonitrile (Nitroxynil); and 5-chloro-N-(2'-chloro-4'-nitrophenyl) salicylamide (Niclosamide).

A particularly preferred combination comprises a compound of formula (I) and oxyclozanide, preferably in the ratio of 40 to 100 mg./kg. and 3 to 15 mg/kg. respectively. Oxyclozanide is highly effective against adult liver flukes, and in combination with a compound of formula (I), complements its activity.

Excluded from the scope of the present invention are non-sterile mixtures which are mere solutions and suspensions of the known compounds of formula (I) as hereinbefore defined in solvents and liquids known in the literature for use in the synthesis and isolation of the compounds by the methods described therein. Included within the scope of the present invention are such known solutions and suspensions which are pharmaceutically acceptable to the host of the infection to be treated and which contain in addition at least one other pharmaceutically acceptable substance.

The compounds of formula (I) may be prepared by any method known for preparing compounds of similar chemical structure. Thus, the compounds may be prepared by the reaction of a compound of the formula (II)

$$Z - A - Z \qquad (II)$$

wherein Z is a reactive nucleophilic atom or group and A is as defined above, with an alkali metal salt of a p-hydroxyacylanilide of the formula (III)

wherein 'Alk' is conveniently potassium or sodium, B is R or $R^1$, and E is $R^2$ or $R^3$, as defined above in formula (I). In formula (II), Z is preferably a halogen atom, for example chlorine, bromine or iodine, or is p-toluene-sulphonyloxy, but other alkanesulphonyloxy, arylsulphonyloxy or aralkylsulphonyloxy groups may also be used instead. The reaction is carried out in a liquid medium which is preferably a polar liquid and which conveniently may be an optionally aqueous alkanol, for example methanol, ethanol, or isopropanol, or may be dimethylsulphoxide, sulpholane, dimethylformamide, dimethylacetamide, N-methyl-2-pyrollidone, or mixtures of the foregoing. If Z is chlorine, then it is preferable to include a small quantity of potassium iodide in the reaction mixture. The reactants are preferably present in about a 2 to 1 molar ratio of the compounds of formula (III) and (II) respectively, but a slight excess of a compound of formula (III) is conveniently used. The reactants may be heated together under an inert atmosphere, for example nitrogen, at the reflux temperature of the reaction mixture. It will be appreciated that the compounds of formula (I) most conveniently prepared by this method are those in which $R = R^1$ and $R^2 = R^3$.

It will of course be understood that in the course of the above reaction the compounds of formulae (IV) and (V) will be formed as transient intermediates

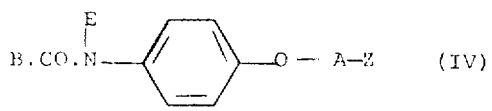

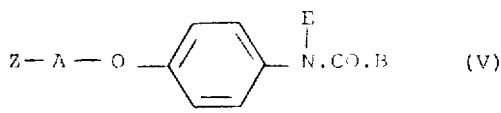

wherein Z, A, E and B are as defined above; and of course a compound of formula (I) may be prepared ab initio by reaction of a compound of formula (IV) or (V), with about an equimolar quantity of the compound of formula (III), under the conditions previously described above. It will be further understood that the compounds of formula (I) wherein R differs from $R^1$ and $R^2$ differs from $R^3$ are preferably prepared in this manner.

The compounds of formula (III) identified above may be optionally formed in situ from the corresponding phenol using such basic reagents as sodium hydride, potassium hydroxide, sodium hydroxide, an alkali metal alkoxide, for example potassium tertiary butoxide, sodium ethoxide, sodium methoxide, or a mixture of an alkali metal carbonate and an aliphatic ketone, for example potassium carbonate and acetone.

The compounds of formula (I) may also be prepared by the acylation of an amine of formula (VI)

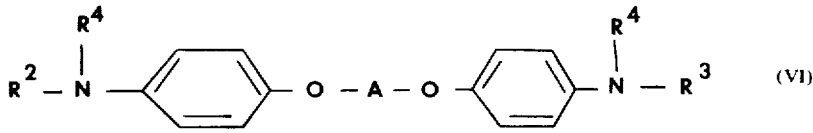

wherein $R^2$ and $R^3$ are as defined above, and wherein both of $R^4$ are hydrogen, or one is hydrogen and the other is a group M.CO— where M is one of R and $R^1$ as defined above; and wherein A is as defined above in formula (I). The acylation may be carried out by any known means and conveniently in a polar or non-polar liquid medium, the nature of which is dependent upon the acylating agent used. Thus if the acid is used, it is preferred to heat the reactants in excess of the acid. If an acid anhydride is used, then water, an aromatic hydrocarbon, such as benzene, a halogenated aliphatic hydrocarbon such as chloroform, or an ether such as dioxane, may be used as the liquid medium. An aromatic hydrocarbon or an ether may also be used as the liquid medium if an acid chloride is chosen as the reactant. An ether, an aromatic hydrocarbon or a halogenated aliphatic hydrocarbon may also be used as the liquid medium if a ketene is used as the acrylating agent. The medium may be an excess of the acylating agent above that demanded by the equation of the reaction, for example if using an alkyl ester. The formamido derivatives, that is to say those compounds of formula (I) wherein either or both of R and $R^1$ are hydrogen, are preferably prepared by the use of formic acid, which may be present in excess to act as a solvent.

The compounds within formula (I) wherein either or both of the groups R and $R^1$ are saturated aliphatic hydrocarbon groups substituted by an amino, N-alkylamino or N,N-dialkylamino group may also be prepared by the reaction of ammonia or a primary or secondary alkyl amine, as appropriate, with the corresponding halo-substituted compound and this latter may itself be prepared from the amine of formula (VI) by haloacylation using, for example, a halo-substituted monocarboxylic acid such as monochloracetic acid.

Those compounds as hereinabove defined within formula (I) that form acid addition salts may be isolated as such or as the base thereof and may be optionally converted, as appropriate, to the base, an acid addition salt thereof or the salt of another acid by methods known in the art.

According to the present invention there are therefore provided the novel compounds of formula (I); and pharmaceutical formulations comprising the compounds of formula (I) in association with an inert carrier therefor; and methods of making such novel compounds and such pharmaceutical formulations. The present invention also provides a method for the treatment of infections of liver flukes in mammals comprising the administration to the host of the infection an effective amount of a compound of formula (I).

In the Examples Nos. 1 to 23, 26 and 27, the compound of formula (I) therein referred to is bis-{β-(4-acetamidophenoxy)ethyl} ether. The numbered Examples of the invention are included to indicate the precise manner in which the invention may be put into practice, and should not be construed as limiting in anyway the scope of the invention disclosed in this specification.

The following are examples of the synthesis of bis-[β-(4-acetamidophenoxy)ethyl] ether.

Synthesis of bis-[β-(4-acetamidophenoxy)ethyl] ether.

To a solution of p-hydroxyacetanilide (169 g., 1.12 M) in dimethyl sulphoxide (590 ml.) was added potassium tertiary butylalcoholate (112.5 g., 1.0 M). The reaction mixture spontaneously heated from about 50°C to 90°C and turned green. After stirring under nitrogen for about 5 minutes, bis-(β-chloroethyl) ether (82.5 g., 0.585 M) was added dropwise over about 10 minutes with stirring. The reaction mixture was stirred overnight, and the majority of the dimethyl sulphoxide evaporated off. The remaining liquid was diluted with about 3 times its volume of water and the precipitate filtered to provide crystals, m.p. 105° – 110°C. After two recrystallisations from a water/ethanol mixture, and washing with ethanol, the product had an initial. m.p 141.3° to 141.7°C. On raising the temperature, the compound solidified and then remelted at 161–162°C. Further synthesis of bis-[β-(4-acetamidophenoxy)ethyl] ether.

Sodium (4.9 g., 0.21 M) was dissolved in ethanol (200 ml., 99.5%) and p-hydroxyacetanilide (31.7 g., 0.21 M) added to the warm solution; bis-(β-chloroethyl) ether (11.7 ml., 0.10 M) and potassium iodide (10 g.) were then added. The mixture was heated for 16 hours, the greater part of the alcohol removed by distillation in vacuo, and the residue poured into water (500 ml.). The precipitate was washed with aqueous sodium hydroxide (2 N) and water. After drying the product had an initial. m.p 141°–145°C. On raising the temperature, the compound solidified and then remelted at 161°–162°C.
Further synthesis of bis-[β-(4-acetamidophenoxy)ethyl)ether.

Bis-[β(4-nitrophenoxy)ethyl] ether (21.5 g.) was reduced with Adams' platinum catalyst and hydrogen in ethanol (250 ml.) at 50°C. A second addition of catalyst and glacial acetic acid (50 ml.) were added when the reaction slowed down. After about the theoretical amount of hydrogen had been taken up, the reduction mixture was diluted with aqueous hydrochloric acid (100 ml. of N-acid), then with water (300 ml.), and the mixture filtered to remove the platinum and a little solid. The filtrate was treated with acetic anhydride (50 ml.), and then with aqueous sodium hydroxide (50%), until the mixture was pH 9 to 10. Further acetic anhydride was added (50 ml.), the solution heated, charcoal added to remove colour, filtered, and water added to precipitate bis-[β-(4-acetamidophenoxy)ethyl]ether which was found to have an initial melting point of 142.7° to 143.1°C. On raising the temperature, the compound resolidified and then remelted at 154°C.
Further synthesis of bis-[β- (4-acetamidophenoxy)ethyl] ether.

Sodium (5.1 g., 0.22 M) was dissolved in dried ethanol (200 ml.), and p-hydroxyacetanilide (33.2 g., 0.22 M) was added to the warm solution. After the anilide had dissolved, bis-(β-chloroethyl) ether (11.7 ml., 0.10 M) and potassium iodide (10 g.) were added and the mixture was refluxed with stirring for 16 hours. After removing a greater part of the ethanol by distillation in vacuo, the residue was poured into water (500 ml.), the precipitate filtered off and washed with aqueous sodium hydroxide (2N) and water. After drying, the product was recrystallised from industrial methylated spirits, and had a melting point of 142°C. On raising the temperature, the compound resolidified and then remelted at 161°–2°C.
Further synthesis of bis-[β-(4-acetamidophenoxy)ethyl]ether.

Sodium (0.80 g., 0.035 M) was dissolved in dried ethanol (40 ml.) and p-hydroxyacetanilide (5.45 g., 0.036 M) was added to the warm solution. After the p-hydroxyacetanilide had dissolved, bis-[β-(4-toluenesulphonyloxy)ethyl] ether (6.60 g., 0.016 M) was added and the mixture refluxed with stirring for 24 hours. After concentration of the reaction mixture in vacuo and pouring it into water, a precipitate was filtered off, washed with aqueous sodium hydroxide (2N) and water. After drying the product was recrystallised from methylated spirit, final m.p. 161°–2°C.

| Example 1 — Aqueous Suspensions | | | | | |
|---|---|---|---|---|---|
| Compound of formula (I) | 5.0% | 20.00% | 40.00% | 50.00% | w/w |
| Bentonite (Gelling Agent) | 2.5% | 1.50% | 1.00% | 1.00% | w/w |
| Bevaloid Dispersant (Trade Mark) (Dispersing agent) | 1.0% | 1.00% | 1.00% | 1.00% | w/w |
| Sodium Benzoate (Buffering agent) | 1.0% | 1.00% | 1.00% | 1.00% | w/w |
| Water | 90.5% | 76.50% | 57.00% | 47.00% | w/w |
| | 100.0% | 100.00% | 100.00% | 100.00% | w/w |

The bentonite was dispersed in some of the water, the Bevaloid Dispersant and sodium benzoate added, and finally the finely ground active ingredient and balance of the water. The whole was mixed until uniform.

Bentonite is a colloidal clay consisting principally of montmorillonite, $Al_2O_3HSiO_2H_2O$, and Bevaloid Dispersant is disodium salt of the condensation product of naphthalene sulphonic acid and formaldehyde.

| Example 2 — Aqueous Suspensions | | | | | | |
|---|---|---|---|---|---|---|
| Compound of formula (I) | 30.00% | w/w | 20.00% | w/w | 50.00% | w/w |
| Sulphite Residue (Dispersing agent) | 5.00% | w/w | 5.00% | w/w | 5.00% | w/w |
| Carmoss (Gelling agent) (Trade Mark) | 0.75% | w/w | 0.75% | w/w | 0.75% | w/w |
| Water | 64.25% | w/w | 74.25% | w/w | 44.25% | w/w |
| | 100.00% | w/w | 100.00% | w/w | 100.00% | w/w |

The Carmoss and sulphite residue were dissolved in the water, the finely ground active ingredient added, and the whole mixed until uniform.

Sulphite residue is crude calcium lignin sulphonate; Carmoss is a carragenate or a sulphuric acid ester of a polysaccharide.

| Example 3 – Aqueous Suspension | | |
|---|---|---|
| Compound of formula (I) | 5.0% | w/w |
| Neosyl (Diluent) | 5.0% | w/w |
| Carmoss (Gelling agent) (Trade Mark) | 1.5 | w/w |
| Bevaloid Dispersant (Dispersing agent) | 1.0 | w/w |
| Water | 87.5% | w/w |
| | 100.0% | w/w |

The Carmoss and Bevaloid Dispersant were mixed with the water, and then the finely ground active ingredient and the Neosyl added. The whole was mixed until uniform.

Neosyl is a diluent of finely prepared silica which functions as a stiffening agent.

Example 4 — Aqueous Suspensions

| | | | | | | |
|---|---|---|---|---|---|---|
| Compound of formula (I) | 20.00% | w/w | 50.00% | w/w | 5.00% | w/w |
| Bevaloid Dispersant (Trade Mark) (Dispersing agent) | 1.00% | w/w | 1.00% | w/w | 1.00% | w/w |
| Gum Tragacanth (Suspending agent) | 0.50% | w/w | 0.30% | w/w | 0.70% | w/w |
| Water | 78.50% | w/w | 48.70% | w/w | 93.30% | w/w |
| | 100.00% | w/w | 100.00% | w/w | 100.00% | w/w |

The gum tragacanth was dissolved in the water, the Bevaloid Dispersant then added and finally the finely ground active ingredient. The whole was mixed until uniform.

Gum Tragacanth is the dried mucilaginous exudation from the Astragalus species.

Example 5 — Aqueous Suspensions

| | | | | | | |
|---|---|---|---|---|---|---|
| Compound of formula (I) | 20.00% | w/w | 50.00% | w/w | 5.0% | w/w |
| Keltrol (Trade Mark) (Suspending agent) | 0.20% | w/w | 0.10% | w/w | 0.3% | w/w |
| Bevaloid Dispersant (Trade Mark) | 1.00% | w/w | 1.00% | w/w | 1.0% | w/w |
| Water | 78.80% | w/w | 48.90% | w/w | 93.7% | w/w |
| | 100.00% | w/w | 100.00% | w/w | 100.00% | w/w |

The Keltrol was dissolved in the water, the Bevaloid Dispersant added, and finally the finely ground active ingredient. The whole was mixed until uniform.

Keltrol is a xanthan gum, a high molecular weight linear polysaccharide.

Example 6 — Aqueous Suspensions

| | | | | | | |
|---|---|---|---|---|---|---|
| Compound of formula (I) | 20.00% | w/w | 50.00% | w/w | 5.00% | w/w |
| Manucol (Trade Mark) (Suspending agent) | 0.25% | w/w | 0.15% | w/w | 0.40% | w/w |
| Bevaloid Dispersant (Trade Mark) (Dispersing agent) | 1.00% | w/w | 1.00% | w/w | 1.00% | w/w |
| Water | 78.75% | w/w | 48.85% | w/w | 93.60% | w/w |
| | 100.00% | w/w | 100.00% | w/w | 100.00% | w/w |

The Manucol was dissolved in the water, the Bevaloid Dispersant added, and finally the finely ground active ingredient, the whole being mixed until uniform.

Manucol us a sodium alginate.

Example 7 — Aqueous Suspensions

| | | | | | | |
|---|---|---|---|---|---|---|
| Compound of formula (I) | 20.00% | w/w | 50.00% | w/w | 5.00% | w/w |
| Bevaloid Dispersant (Trade Mark) (Dispersing agent) | 1.00% | w/w | 1.00% | w/w | 1.00% | w/w |
| Sodium benzoate (Buffering agent) | 1.00% | w/w | 1.00% | w/w | 1.00% | w/w |
| Polyvinyl pyrrolidone (PVP 90) (Suspending agent) | 8.00% | w/w | 6.00% | w/w | 15.00% | w/w |
| water | 70.00% | w/w | 42.00% | w/w | 78.00% | w/w |
| | 100.00% | w/w | 100.00% | w/w | 100.00% | w/w |

The polyvinyl pyrrolidone was dissolved in the water with stirring, and when dissolved the Bevaloid Dispersant and sodium benzoate added. Finally the finely ground active ingredient was added and mixed until uniform.

Polyvinyl pyrrolidone is a polymerised form of vinylpyrollidone.

Example 8 — Aqueous Suspensions

| | | | | | | |
|---|---|---|---|---|---|---|
| Compound of formula (I) | 5.0% | w/w | 20.00% | w/w | 50.0% | w/w |
| Bevaloid Dispersant (Trade Mark) (Dispersing agent) | 1.0% | w/w | 1.00% | w/w | 1.0% | w/w |
| Sodium Benzoate (Buffering agent) | 1.0% | w/w | 1.00% | w/w | 1.0% | w/w |
| Courlose F.700 (Trade Mark) (Suspending agent) | 1.0% | w/w | 0.60% | w/w | 0.5% | w/w |
| Zircomplex P.A. (Trade Mark) (Suspending agent) | 2.5% | w/w | 1.60% | w/w | 1.25% | w/w |
| Water | 89.5% | w/w | 75.80% | w/w | 46.25% | w/w |
| | 100.0% | w/w | 100.00% | w/w | 100.0% | w/w |

The Courlose was dissolved in the water, the Zircomplex P.A. then added, followed by the Bevaloid Dispersant and sodium benzoate and finally the finely ground active ingredient. The whole was mixed until uniform.

Courlose F 700 is the sodium salt of carboxymethylcellulose; Zircomplex P.A. is an organic complex of zirconium.

added, and the whole mixed until uniform.
Natrosol 250 is hydroxyethylcellulose.

| Example 9 — Aqueous Suspensions | | | | | | |
|---|---|---|---|---|---|---|
| Compound of formula (I) | 20.00% | w/w | 50.0% | w/w | 5.0% | w/w |
| Bevaloid Dispersant (Trade Mark) (Dispersing agent) | 1.0% | w/w | 1.0% | w/w | 1.0% | w/w |
| Gum Arabic (Thickening agent) | 0.5% | w/w | 0.3% | w/w | 2.0% | w/w |
| Water | 78.5% | w/w | 48.7% | w/w | 92.0% | w/w |
| | 100.0% | w/w | 100.0% | w/w | 100.0% | w/w |

The Gum Arabic was dissolved in the water, the Bevaloid Dispersant and the finely ground active ingredient added, and the whole mixed until uniform.

Gum Arabic is the dried exudation from the stem and branches of Acacia senegal.

| Example 10 — Aqueous Suspensions | | | | | | |
|---|---|---|---|---|---|---|
| Compound of formula (I) | 20.0% | w/w | 50.0% | w/w | 5.0% | w/w |
| Bevaloid Dispersant (Trade Mark) (Wetting agent) | 1.0% | w/w | 1.0% | w/w | 1.0% | w/w |
| Courlose F 700 (Trade Mark) (Suspending agent) | 1.0% | w/w | 0.5% | w/w | 2.0% | w/w |
| Water | 78.0% | w/w | 48.5% | w/w | 92.0% | w/w |
| | 100.0% | w/w | 100.0% | w/w | 100.0% | w/w |

The Courlose F 700 was dissolved in the water, the Bevaloid Dispersant and the finely ground active ingredient added, and the whole mixed until uniform.

Curlose F 700 is sodium carboxymethylcellulose.

| Example 11 — Aqueous Suspensions | | | | | | |
|---|---|---|---|---|---|---|
| Compound of formula (I) | 20.0% | w/w | 50.0% | w/w | 5.0% | w/w |
| Bevaloid Dispersant (Trade Mark) (Wetting agent) | 1.0% | w/w | 1.0% | w/w | 1.0% | w/w |
| Natrosol 250 (Trade Mark) (suspending agent) | 0.05% | w/w | 0.03% | w/w | 0.1% | w/w |
| Water | 78.95% | w/w | 48.97% | w/w | 93.9% | w/w |
| | 100.00% | w/w | 100.00% | w/w | 100.00% | w/w |

The Natrosol was dissolved in the water, the Bevaloid Dispersant and the finely ground active ingredient

| Example 12 — Oil-based Pastes | | | | | | | | |
|---|---|---|---|---|---|---|---|---|
| China clay (Solid Diluent | — | | — | | — | | 20.0% | w/w |
| Mineral Oil (Liquid Diluent | 50.0% | w/w | 40.0% | w/w | 60.0% | w/w | 60.0% | w/w |
| Compound of formula (I) | 50.0% | w/w | 60.0% | w/w | 40.0% | w/w | 20.0% | w/w |
| | 100.0% | w/w | 100.0% | w/w | 100.0% | w/w | 100.0% | w/w |

The components were mixed in suitable equipment, to provide pastes of uniform consistency.

Mineral oil is a high boiling fraction of a refined petroleum oil containing not less than 96% unsulphonatable material.

| Example 13 — Oil-Based Pastes | | | | | |
|---|---|---|---|---|---|
| Mineral Oil (Liquid Diluent) | 10.0% | 40.0% | 32.0% | 49.5% | w/w |
| Vaseline (Thickening agent) | 70.0% | 10.0% | 8.0% | 5.5% | w/w |
| Compound of formula (I) | 20.0% | 50.0% | 60.0% | 45.0% | w/w |
| | 100.0% | 100.0% | 100.0% | 100.0% | w/w |

The vaseline was dissolved in the mineral oil and the finely ground active ingredient added and mixed in suitable equipment until uniform.

Vaseline is petroleum jelly.

| Example 14 — Oil-Based Pastes | | | | | |
|---|---|---|---|---|---|
| China clay (Solid Diluent) | 30.00% | — | — | — | w/w |
| Mineral Oil (Liquid Diluent) | 46.75% | 36.25% | 46.75% | 51.00% | w/w |
| Bentone 38 (Trade Mark) (Thickening agent) | 2.50% | 2.75% | 2.50% | 3.00% | w/w |
| Industrial methylated spirits | 0.75% | 1.00% | 0.75% | 1.00% | w/w |
| Compound of formula (I) | 20.00% | 60.00% | 50.00% | 45.00% | w/w |
| | 100.00% | 100.00% | 100.00% | 100.00% | w/w |

The Bentone 38 was added to the mineral oil, and stirred vigorously for 15 minutes, after which time the methylated spirits were added and the whole stirred for a further 30 minutes. The finely ground active ingredient was then added and the whole mixed until uniform. Where China clay was an ingredient, it was included at the same time as the addition of the compound of formula (I).

Bentone 38 is a cationic bentonite substituted with a quaternary ammonium base.

| Example 15 — Water-Based Pastes | | | | | |
|---|---|---|---|---|---|
| Compound of formula (I) | 23.0% | 55.00% | 60.00% | 45.00% | w/w |
| Keltrol (Trade Mark) (Suspending agent) | 0.5% | 0.50% | 0.45% | 0.55% | w/w |
| Neosyl (Diluent) | 18.3% | — | 5.00% | — | |
| Glycerine (Humectant) | 23.0% | 20.00% | 18.00% | 22.00% | w/w |
| Water | 35.2% | 24.50% | 16.55% | 32.45% | w/w |
| | 100.0% | 100.00% | 100.00% | 100.00% | w/w |

The Keltrol was dissolved in the water, the remaining ingredients incorporated, andd the whole mixed until uniform.

Keltrol is a xanthan gum, a high molecular weight linear polysaccharide.

| Example 16 — Water-Based Pastes | | | | | |
|---|---|---|---|---|---|
| Compound of formula (I) | 20.0% | 50.00% | 60.00% | 40.00% | w/w |
| Bevaloid Dispersant (Trade Mark) (Dispersing agent) | 0.5% | 0.50% | 0.40% | 0.60% | w/w |
| Gum Tragacanth (Suspending agent) | 3.5% | 2.00% | 1.60% | 2.40% | w/w |
| Glycerine (Humectant) | 16.0% | 8.50% | 8.00% | 11.00% | w/w |
| Water | 60.0% | 39.00% | 30.00% | 46.00% | w/w |
| | 100.0% | 100.00% | 100.00% | 100.00% | w/w |

The gum tragacanth was dissolved in the mixture of water and glycerine, and the finely divided active ingredient incorporated to provide a uniform paste.

| Example 17 — Pastes | | | | | | |
|---|---|---|---|---|---|---|
| Compound of formula (I) | 50.0% | 60.0% | 50.0% | 60.0% | 20.0% | w/w |
| Polyethylene Glycol 400 | 40.0% | 32.0% | 50.0% | 40.0% | 45.0% | w/w |
| Polyethylene Glycol 4000 | 10.0% | 8.0% | — | — | 5.0% | w/w |
| China clay (Solid diluent) | — | — | — | — | 30.0% | w/w |
| | 100.0% | 100.0% | 100.0% | 100.0% | 100.0% | w/w |

Both glycols, or the single glycol, as appropriate, were heated together, and when uniform, the finely ground active ingredient, (together with the China clay, if appropriate) was added, and the mixture stirred to provide a paste of uniform consistency.

| Example 18 — Pastes | | | | | | | | |
|---|---|---|---|---|---|---|---|---|
| Compound of formula (I) | 50.0% | w/w | 60.0% | w/w | 40.0% | w/w | 20.0% | w/w |
| Carmoss (Trade Mark) (Thickening agent) | 2.0% | w/w | 1.6% | w/w | 2.5% | w/w | 1.7% | w/w |
| Glycerine (Humectant) | 10.0% | w/w | 8.0% | w/w | 12.0% | w/w | 8.3% | w/w |
| Water | 38.0% | w/w | 30.4% | w/w | 45.5% | w/w | 31.7% | w/w |
| China clay (Solid Diluent) | — | | — | | — | | 38.3% | w/w |
| | 100.0% | w/w | 100.0% | w/w | 100.0% | w/w | 100.0% | w/w |

The Carmoss was dissolved in the water, the glycerine added, followed by the active ingredient (and China Clay, if appropriate). The whole was mixed until uniform.

Carmoss is a carragenate or a sulphuric acid ester of a polysaccharide.

Example 19 — Pastes

| Compound of formula (I) | 60.0% | w/w | 70.0% | w/w | 45.0% | w/w | 20.0% | w/w |
|---|---|---|---|---|---|---|---|---|
| Manucol (Trade Mark) (Thickening agent) | 0.3% | w/w | 0.25% | w/w | 0.4% | w/w | 1.5% | w/w |
| Glycerine (Humectant) | 8.0% | w/w | 6.00% | w/w | 11.0% | w/w | 5.0% | w/w |
| Water | 31.7% | w/w | 23.75% | w/w | 43.6% | w/w | 38.5% | w/w |
| China clay (Solid Diluent) | — | | — | | — | w/w | 35.0% | w/w |
| | 100.0% | w/w | 100.0% | w/w | 100.0% | w/w | 100.0% | w/w |

The Manucol was dissolved in the water and glycerine and the active ingredient (and China Clay, if appropriate) added and mixed until uniform.

Manucol is sodium alginate.

Example 20 — Oil-in-Water Emulsion Pastes

| Compound of formula (I) | 5.0% | w/w | 50.0% | w/w |
|---|---|---|---|---|
| Sipol Wax AO (Trade Mark) (Emulsifying agent) | 6.25% | w/w | 5.0% | w/w |
| Mineral Oil (Liquid Diluent) | 25.0% | w/w | 20.0% | w/w |
| Water | 31.25% | w/w | 25.0% | w/w |
| China Clay (Solid Diluent) | 17.50% | w/w | — | |
| | 100.0% | w/w | 100.0% | w/w |

The Sipol wax AO was dissolved in the mineral oil at 60°C, and this solution then added with vigorous stirring to the water, also at 60°C. Stirring was continued until the emulsion was cooled to 25°–30°C, at which temperature the finely ground active ingredient (and the China clay where appropriate) was added, and the whole mixed until uniform.

Sipol wax AO is Cetomacrogol Emulsifying Wax BPC.

Example 21 — Wettable Powders

| Compound of formula (I) | 85.0% | w/w | 20.0% | w/w |
|---|---|---|---|---|
| Neosyl (Trade Mark) (Diluent) | 1.0% | w/w | 24.0% | w/w |
| Bevaloid Dispersant (Trade Mark) (Dispersing agent) | 2.0% | w/w | 2.0% | w/w |
| Perminal BX (Trade Mark) (Wetting agent) | 0.2% | w/w | 0.2% | w/w |
| Natrosol 250 (Trade Mark) (Suspending agent) | 1.7% | w/w | 2.8% | w/w |
| Sodium sulphate (Suspending agent) | 10.1% | w/w | 51.0% | w/w |
| | 100.0% | w/w | 100.0% | w/w |

The raw materials were mixed together to provide a powder of uniform consistency. Perminal BX is the sodium salt of alkylated naphthalene sulphonic acid.

Example 22 — Feed Premixes

| Compound of formula (I) | 1% | w/w | 80% | w/w |
|---|---|---|---|---|
| Cereal Base | 99% | w/w | 20% | w/w |

The two materials were mixed to provide a premix of uniform consistency.

Example 23 — Pellets

| Compound of formula (I) | 1% | 80% |
|---|---|---|
| Cereal Base | 99% | 20% |

The two ingredients were mixed, and the mixture then fed to any conventional feedstuff pelleting plant.

EXAMPLE 24

Tablets were prepared from the following ingredients:

| | per tablet |
|---|---|
| 1. Bis-[β-(4-acetamidophenoxy)ethyl] ether | 2000 mg. |
| 2. Starch B.P. | 300 mg. |
| 3. Povidone B.P.C. | 50 mg. |
| 4. Magnesium stearate B.P. | 25 mg |

Item 1 and half the quantity of item 2 were granulated with a solution of item 3 in 50% aqueous ethanol, and dried. The remainder of item 2 and then item 4 were added and the whole mixed. The resulting granules were then compressed with a suitably shaped punch.

EXAMPLE 25

Tablets were prepared from the following ingredients:

| | per tablet |
|---|---|
| 1. Bis-[β-(4-acetamidophenoxy)ethyl] ether | 2000 mg. |
| 2. Microcrystalline cellulose | 1000 mg. |
| 3. Methylhydroxyethylcellulose | 50 mg. |
| 4. Starch B.P. | 250 mg. |
| 5. Magnesium stearate | 30 mg. |

Item 1, together with half the quantity of items 2 and 4, were granulated with a solution of item 3 in 50% aqueous ethanol, and then dried. The remainder of items 2 and 4 were added, and then item 5, and the whole mixed together. The resulting granules were dried and then compressed to form tablets.

EXAMPLE 26 — TREATMENT OF F. HEPATICA

The compound of formula (I), of a particle size 3.0μ, was used in the following experiment.

Fourteen Cheviot and Dorset Down sheep approximately fifteen months old were experimentally infected with F. hepatica by giving each animal approximately 200 metacercariae in water by drenching bottle. Batches of metacercariae collected over three months were used and each animal received a similar number from each batch.

The animals were assigned to three groups on the basis of bodyweight and treated as follows:

| Group No. | Dose (mg/kg) | Age of F. hepatica at time of treatment (weeks) | No. of animals |
|---|---|---|---|
| I | 100 | 6 | 4 |
| II | 100 | 8 | 4 |
| III | Untreated Controls | | 6 |

Each dose was calculated individually on the basis of bodyweight on the day before treatment. The dose was suspended in water, to which a little Hederol (a wetting agent, sold by Proctor & Gamble) was added, and given by drenching bottle.

The sheep were slaughtered ten to eleven weeks after infection and the livers were examined. The following results were obtained.

| Dose (mg/kg) | Age of F. hepatica at time of treatment (weeks) | Mean No. F. hepatica found post mortem | Percentage clearance |
|---|---|---|---|
| 100 | 6 | 1.0 | 99 |
| 100 | 8 | 2.75 | 97 |
| Untreated controls | | 83 | — |

In the same experiment, hexachlorophene at a dose of 10 mg./kg. gave clearances of 67 and 71% of six- and eight-week old liver flukes.

EXAMPLE 27

A further experiment was conducted in the manner described in Example 26, except that the sheep were dosed at 3 and 5 weeks after infection with the compound of formula (I). The following results were obtained:

| Dose (mg./kg.) | Age of F. hepatica at time of treatment (weeks) | Mean No. F. hepatica found post mortem at 6 weeks |
|---|---|---|
| 50 | 3 | 3 |
| | | 0 |
| | | 0 |
| | | 0 |
| 100 | 3 | 0 |
| | | 0 |
| | | 0 |
| | | 0 |
| 100 | 5 | 0 |
| Controls | | 9 (stunted) |
| | | 33 |
| | | 77 |
| | | 100 |
| | | 125 |

EXAMPLE 28

Synthesis of bis-[β-(4-formamidophenoxy)ethyl]ether

A mixture of β,β'-bis-(4-aminophenoxy)ethyl ether (28.8 g.) and formic acid (23 ml. of 98–100%) was mixed and heated overnight on a steam bath. The mixture was then poured with stirring into cold water (500 ml.). The resulting crystals were filtered from the supernatant liquid, and washed with water, to leave a crystalline solid m.p. 151°–155° C. This solid was recrystallized from hot ethanol (about 1.4 litre, 95%) by adding hot water (about 1 litre), charcoaling while hot to remove most of the colour, filtering, and adding more water (about 1.5 litre) to the filtrate. The resulting solid m.p. 156.5°–157°C, was again recrystallized from an ethanol-water mixture, m.p. 156°C.

Analysis: Calculated for $C_{18}H_{20}N_2O_5$: C,62.78; H, 5.85; N, 8.14 Found: C, 62.80; H, 5.80; N, 8.10

EXAMPLE 29

Synthesis of β-(4-acetamidophenoxy)ethyl β'-(4-propionamidophenoxy)ethyl ether p-Propionamidophenol (30 g.) dissolved in dry dimethylsulfoxide (200 ml.) was treated in a nitrogen atmosphere with potassium tertiary butoxide (18.5 g.). After having been stirred for about 10 minutes, the reaction mixture was treated with β-chloroethyl β'-(4-acetamidophenoxy)ethyl ether (39 g.), and heated and stirred on a steam bath in a nitrogen atmosphere for 26 hours. The solution precipitated a voluminous purplish-white solid on treatment with water (700 ml.). The solid was filtered from the aqueous solution, and washed with water. It had m.p. 137.2°–138.4°C. It was recrystallized from a hot ethanol-water mixture, charcoal added and the mixture filtered with a little filter-aid, to gave a product of the same m.p. This was recrystallized again to give a first crop of offwhite crystals melting on slow heating at 136.5° C. A tan coloured second crop m.p. 135° C came out later.

Analysis: Calculated for $C_{21}H_{26}N_2O_5$, Molecular Weight 390.44: C, 65.62; H, 6.71; N, 7.18 Found: C, 65.51; H, 6.83; N, 7.18

EXAMPLE 30

Synthesis of β-(4-acetamidophenoxy(ethyl β'-(4-formamidophenoxy)ethyl ether

β-Chloroethyl β'-(4-acetamidophenoxy)ethyl ether (38.5 g.; 95% by assay; 0.142 Mole) was added to a stirred solution of p-formamidophenol (24.3 g.; 0.18 Mole) and potassium tertiary butoxide (18 g.) (added in that order under nitrogen) in dry dimethyl sulfoxide (100 ml.). After addition of more dimethyl sulphoxide (100 ml.), the reaction mixture was stirred and heated on steam under nitrogen for 48 hours. It was then poured into water (about 2 litres), scratched to induce partial crystallization, and stored at 4° C. overnight. Decantation of some crystals and the aqueous solution from a matrix of crystals in oil, trituration of the latter with ether and filtration of the resulting solution-suspension, left a largely solid mass. Meanwhile, filtration of the alkaline aqueous decantate (above) gave crystals m.p. 100°–101° C, depressed in m.p. on admixture with starting halo-ether of m.p. 97°–98° C.

The residue of the ether trituration melted poorly at about 76.5°–81° C after one recrystallization from an ethanolbenzene-hexane mixture. It was then recrystallized from acetonewater, charcoaling to remove colour. It crystallized slowly after seeding and scratching repeatedly, to give a product m.p. 102.5–104°C. This was again recrystallized from acetonewater for analysis, m.p. 105.2–108° C. Thin layer chromatography suggested the presence of 10% or less of bis-[β-(4-acetamidophenoxy)ethyl] ether.

Analysis: Calculated for $C_{19}H_{22}N_2O_5$, Molecular Weight 358.39: C, 63.17; H, 6.23; N, 7.69.
Found: C, 63.87; H, 6.28; N, 7.70.

EXAMPLE 31

Synthesis of bis-[β-(4-butyramidophenoxy)ethyl)]ether

A mixture of bis-[β- (4-aminophenoxy)ethyl] ether (14.4 g., 0.05 M) in pyridine (200 ml.) was treated dropwise at −10°C to 0°C with butyryl chloride (14.8 g., 0.14 M) over half of an hour. After 2 hours stirring at 0°C and 4 hours at 60°C, the mixture was cooled, filtered, washed with hydrochloric acid (2N), water, dried and recrystallised from methanol to yield a product, m.p. 160°–161°C.
Analysis: Calculated: C,67.27 H,7.53 N,6.54
Found: C,67.26 H,7.59 N,6.35

EXAMPLE 32

Synthesis of bis-[β-(4-lactamidophenoxy)ethyl]ether

A mixture of bis-[β-(4-aminophenoxy)ethyl] ether (17.1 g., 0.059 M) and ethyl lactate (40 ml., 0.36 M) were heated for about 50 hours until no more ethanol distilled off. The mixture was then evaporated to dryness in vacuo and extracted with hot water (1,500 ml.). Concentration and cooling of the aqueous extracts caused precipitation of crystals, m.p. 127°–129°C.
Analysis: Calculated: C,61.10 H,6.53 N,6.48
Found: C,61.05 H,6.63 N,6.30

EXAMPLE 33

Synthesis of bis-(4-acetamidophenoxy)methane

A solution of p-hydroxyacetanilide (14.1 g.) and potassium tertiary butoxide (11.2 g.) in dimethyl sulphoxide (25 ml.) was added to methylene chloride (20.0 g.) dissolved in dimethyl sulphoxide (25 ml.) in a pressure bottle. The mixture was heated on a steam bath for 3 days, cooled, and poured into water (500 ml.). The precipitate which formed was filtered and washed with 0.5N sodium hydroxide (1500 ml.) and then with water (500 ml.). Recrystallisation from aqueous ethanol yielded bis-(4-acetamidophenoxy)methane, m.p. 184°–185°C.
Analysis: Calculated: C,64.97 H,5.73 N,8.92
Found: C,65.09 H,5.81 N,8.90

EXAMPLE 34

Synthesis of bis-[β-(4-acetamidophenoxy)isopropyl]ether

Potassium tertiary butoxide (210 g., 1.87M) was added with stirring over a period of about 1 minute to a solution of p-hydroxyacetanilide (315 g., 2.09M) in dimethyl sulphoxide (1000 ml.). After stirring for 10 minutes at 70°C. (exothermic heating), β,β'-dichloroisopropyl ether (161.8g., 1.03M) was added and the stirring maintained on a steam bath for 3 days. The mixture was poured into water (4000 ml.) and the resulting semi-solid recrystallised twice with charcoaling from aqueous ethanol (95%) to give bis-[β-(4-acetamidophenoxy) isopropyl]ether, m.p. 166°–166.5°C.
Analysis: Calculated: C,65.98 H,7.05 N,7.00
Found: C,65.76 C,7.08 N,6.94

EXAMPLE 35

Synthesis of bis-[β-(4-pivalamidophenoxy)ethyl]ether

A suspension of bis-[β-(4-aminophenoxy)ethyl]ether (28.9 g., 0.1M) in pyridine (19.5 g., 0.245M) and dry tertiary butanol (75 ml.) was added to warm (about 60°C.) pivalyl chloride with stirring. An exothermic reaction occurred and the mixture was allowed to stand for 35 minutes after the addition was complete before being added to water (700 ml.). The crystals which slowly formed were recrystallised with charcoaling from aqueous ethanol (about 70%) to give bis-[β-(4-pivalamidophenoxy)ethyl]ether, m.p. 153.7° – 154.4°C.
Analysis: Calculated: C,68.39 H,7.95N,6.14
Found: C,68.74H,7.99N,6.07

EXAMPLE 36

Synthesis of β-Chloroethyl β'-(4-Acetamidophenoxy)Ethyl Ether p-Acetamidophenol (332 g.) dissolved in dry dimethylsulfoxide (900 ml.) was treated under a nitrogen atmosphere with potassium tertiary butoxide (234 g.) with sufficient cooling to maintain the temperature below about 65°C. The reaction mixture was stirred and cooled to room temperature. β,β'-bis- chloroethyl ether (577 g.) was added and the reaction mixture heated with stirring on a steam bath for 24 hours under a nitrogen atmosphere. The reaction mixture, reduced to about 750 ml. by distillation in vacuo, was poured into water (2.5 l.) and extracted with ether. The ether extracts and an ether-insoluble organic phase were combined and distilled. β-Chloroethyl β'-(4-acetamidophenoxy)ethyl ether was collected at 193°–206°C. and 550–600 microns and then recrystallized from ethanol-water, m.p. 100.6°–101.6°C.
Calculated for $C_{12}H_{16}NO_3Cl$:C, 55.92;H, 6.26; N, 5.44.
Found: C, 56.10; H, 6.25; N, 5.29.

This compound was used in the syntheses described in the foregoing Examples 29 and 30.

EXAMPLE 37

Synthesis of bis-{β-(4-Acetoacetamidophenoxy)ethyl}ether bis-{β-(4-Aminophenoxy)ethyl}ether (57.6 g.) dissolved in acetone (300 ml.) was treated with 450 ml. of 50% diketene in acetone. The reaction mixture was warmed and filtered through a filter-aid using 1.5 l. of warm acetone washes. The filtrate was cooled to 30°C. and water added to incipient turbidity. It was then stored at 4°C. during crystallization. The bis-[β-(4-acetoacetamidophenoxy)ethyl]ether was recrystallized from acetone, m.p. 129.2° – 129.7°C.
Calculated for $C_{24}H_{28}N_2O_7$: C, 63.15; H, 6.18; N, 6.14.
Found: C, 63.29; H, 6.16; N, 6.02.

EXAMPLE 38

Synthesis of Bis-{β-(N-Methyl-p-acetamidophenoxy)Ethyl } Ether

To p-Methylaminophenol sulphate (344 g.), suspended in 95% ethanol (1500 ml.), was added, over a 20 minutes period with warming and stirring under a nitrogen atmosphere, acetic anhydride (307 g.) and 40% sodium hydroxide (285 ml.). The reaction mixture was allowed to stand overnight and the resulting product removed by filtration, washed with water, and recrystallized from ethanol to give N-methyl-p- acetamidophenol (381 g.), m.p. 241.5°–243°C.

Potassium tertiary butoxide (112 g.) was added to a solution of N-methyl-p-acetamidophenol (165 g.) in dry dimethylsulfoxide (1 l.) and the mixture stirred for 30 minutes under a nitrogen atmosphere. To this mixture β,β'-bis-chloroethyl ether (70 g.) was added and the reaction mixture heated with stirring on a steam bath for 5 days under a nitrogen atmosphere. The reaction mixture was cooled, poured into water (3.5 l.), and throughly extracted with ether. The ether extracts were washed with N-sodium hydroxide, then water, and dried over anhydrous magnesium sulphate. The ether was evaporated and the resulting oil distilled to give bis-{β-(N-methyl-p-acetamidophenoxy)ethyl} ether b.p. 222°C. at 0.05 mm of mercury.

Calculated for $C_{22}H_{28}N_2O_5$: C, 66.03; H, 6.99; N, 6.99
Found: C, 65.86; H, 7.01; N, 6.94.

EXAMPLE 39

Aqueous suspensions were prepared having the composition detailed below, wherein the compound of formula (I) is β-(4-acetamidophenoxy)ethyl β'-(4-propionamidophenoxy)ethyl ether.

| | | | | |
|---|---|---|---|---|
| Compound of formula (I) | 5.0% | 20.00% | 40.00% | w/w |
| Bentonite (Gelling Agent) | 2.5% | 1.50% | 1.00% | " |
| Bevaloid Dispersant (Trade Mark) (Dispersing agent) | 1.0% | 1.00% | 1.00% | " |
| Sodium Benzoate (Buffering agent) | 1.0% | 1.00% | 1.00% | " |
| Water | 90.5% | 75.50% | 57.00% | " |
| | 100.0% | 100.00% | 100.00% | w/w |

The bentonite was dispersed in some of the water, the Bevaloid Dispersant and sodium benzoate added, and finally the finely ground active ingredient and balance of the water. The whole was mixed until uniform.

Bentonite is a colloidal clay consisting principally of montmorillonite, $Al_2O_3HSiO_2H_2O$, and Bevaloid Dispersant is disodium salt of the condensation product of naphthalene sulphonic acid and formaldehyde.

EXAMPLE 40

Aqueous suspensions were prepared having the composition detailed below, wherein the compound of formula (I) is β-(4-acetamidophenoxy)ethyl β'-(4-propionamidophenoxy)ethyl ether.

| | | | | | | |
|---|---|---|---|---|---|---|
| Compound of formula (I) | 30.00% | w/w | 20.00% | w/w | 50.00% | w/w |
| Sulphite Residue (Dispersing agent) | 5.00% | " | 5.00% | " | 5.00% | " |
| Carmoss (Gelling agent) (Trade Mark) | 0.75% | " | 0.75% | " | 0.75% | " |
| Water | 64.25% | " | 74.25% | " | 44.25% | " |
| | 100.00% | " | 100.00% | " | 100.00% | " |

The Carmoss and sulphite residue were dissolved in the water, the finely ground active ingredient added, and the whole mixed until uniform.

Sulphite residue is crude calcium lignin sulphonate; Carmoss is a carragenate or a sulphuric acid ester of a polysaccharide.

EXAMPLE 41

Synthesis of bis {(4-acetamidophenoxy)methyl}ether

Sodium (3.9 g., 0.17 mole) was dissolved in ethyl alcohol (150 ml.) and p-hydroxyacetanilide (26.3g, 0.17 mole) added to the warm solution. This solution was then treated with bis(chloromethyl)ether (9.49g, 0.082 mole) over 10 mins. at 20°C. After stirring for 2½ hours the mixture was filtered and the solid product washed with dilute aqueous sodium hydroxide solution and with water. After drying the solid was recrystallized from methylated spirit, m.pt. 172.5°–174.4°C.

Analysis: Calculated for $C_{18}H_{20}N_2O_5$ C, 62.78; H, 5.85; N, 8.14
Found: C, 62.50; N, 5.87; N, 8.06

EXAMPLE 42

Synthesis of bis {β-(4-(β',β'-dimethylacrylamido)-phenoxy)ethyl}ether

Bis β-(4-Aminophenoxy)ethyl ether (7.0g, 0.024 mole) was dissolved in a mixture of chloroform (150 ml.) and pyridine (5 ml.) and the solution was treated drop-wise with β,β-dimethylacryloyl chloride (5.0g, 0.050 mole) over 15 mins. at 10°C. After 2 hours stirring the mixture was filtered and the isolated solid washed with dilute hydrochloric acid and then with water. After drying the product was recrystallized from 2-ethoxyethanol/water with charcoaling to yield crystals, m.pt. 155.9°–157.0°C.

Analysis: Calculated for $C_{26}H_{32}N_2O_5$ C, 69.00; H, 7.13; N, 6.19
Found C, 68.36; H, 7.36; N, 6.05

EXAMPLE 43

Synthesis of bis {β-(4-octanamidophenoxy)ethyl ether

Bis β-(4-Aminophenoxy)ethyl} ether (7.2g, 0.025 mole) was dissolved in pyridine (75 ml) and treated dropwise with octanoyl chloride (10.3g, 0.063 mole) at −10° to 0°C over 75 mins. After stirring for 2 hours, during which time the temperature was allowed to rise to 20°C, the mixture was filtered. The isolated solid was washed with dilute hydrochloric acid and then with water and dried before recrystallizing from methylated spirit with charcoaling, m.pt. 160.2°–161.5°C.

Analysis: Calculated for $C_{32}H_{48}N_2O_5$ C, 71.08; H, 8.94; N, 5.18
Found: C, 71.20; H, 9.11; N, 5.09

EXAMPLE 44

Synthesis of bis{β-(4-cyclopropionamidophenoxy)ethyl}ether

Bis { β-(4-Aminophenoxy)ethyl } ether (7.2g, 0.025 mole) was dissolved in a mixture of chloroform (100 ml) and pyridine (10 ml) and the solution was treated dropwise over 30 mins at 5–10°C with cyclopropylcarboxylic acid chloride (5.7g, 0.055 mole). After 2 hours stirring the mixture was filtered and the product solid washed with dilute hydrochloric acid and then with water. After drying the solid was recrystallized from 2-ethoxyethanol with charcoaling. MPt 189.5°–191.1°C. Analysis: Calculated for $C_{24}H_{28}N_2O_5$ C, 67.90; H, 6.65; N, 6.60
Found: C, 67.90; H, 6.88; N, 6.56

EXAMPLE 45

Synthesis of 1,2-bis(4-acetamidophenoxy)ethane

A solution of sodium ethoxide, prepared from sodium (0.65 g.) and ethanol (15 ml.), was added dropwise to a stirred solution of p-acetamidophenol (4.25 g.) in ethanol (10 ml.) at reflux. A mixture of 1,2-dibromoethane (2.65 g.) and ethanol (5 ml.) was added dropwise and boiling continued for a further 2 hours. After cooling, the solid product was collected by filtration and thoroughly washed with water to yield 1,2-bis(4-acetamidophenoxy) ethane, m.p. 265°–266°C.; it may be recrystallised from acetic acid.

EXAMPLE 46

Synthesis of Bis β-{4-acetamidophenoxy)n-propyl}ether

Sodium (2.16g, 0.094 mole) was dissolved in dried ethanol (200 ml) and p-hydroxyacetanilide (15.1g, 0.100 mole) added. After the p-hydroxyacetanilide had dissolved, bis-β,β'-(mesyloxy n-propyl)ether (11.1g, 0.038 mole) was added and the mixture refluxed with stirring for 37 hours. The ethanol was removed by distillation in vacuo and the residue treated with 2N sodium hydroxide and extracted with chloroform. The oil obtained on removing the chloroform was induced to solidify by cooling and scratching and the solid was recrystallized from methylated spirit, MPt 138.3°–140.3°C.
Analysis: Calculated for $C_{22}H_{28}N_2O_5$ C, 65.98; H, 7.05; N, 7.00
Found: C, 66.59; H, 7.17; N, 7.00

What we claim is:

1. The method of treating a liver fluke infection in an infected mammal which comprises administering to said infected mammal a therapeutically effective liver fluke treatment amount of a compound of the formula

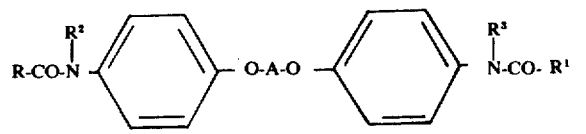

wherein R and $R^1$ are the same or different and each is selected from the class consisting of hydrogen, saturated aliphatic hydrocarbon having 1 to 7 carbon atoms, and unsaturated aliphatic hydrocarbon having 2 to 4 carbon atoms; wherein $R^2$ and $R^3$ are the same or different and each is selected from the class consisting of hydrogen and lower alkyl having 1 to 4 carbon atoms; and wherein A is selected from the class consisting of $-CH_2-$, $-(CH_2)_2-$, $-CH_2-O-CH_2-$, and

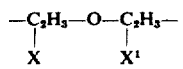

wherein X and $X^1$ are the same or different and each is selected from the class consisting of hydrogen and alkyl having 1 to 3 carbon atoms.

2. The method of claim 1 wherein at least one of R and $R^1$ is an n-alkyl group.
3. The method of claim 1 wherein at least one of R and $R^1$ is an unsaturated aliphatic hydrocarbon group having one ethylenic linkage.
4. The method of claim 1 wherein A is $-CH_2.CH_2-O-CH_2.Ch_2-$.
5. The method of claim 1 wherein $R^2$ and $R^3$ are both hydrogen.
6. The method of claim 1 wherein the mammal is a ruminant.
7. The method of claim 1 wherein the compound is administered in an amount of between 40 and 200 mg. per kilogram of mammal bodyweight.
8. The method of claim 7 in which the mammal is a ruminant.
9. The method of claim 1 in which the compound is administered orally.
10. The method of claim 6 in which the compound is administered orally.
11. The method of claim 8 in which the compound is administered orally.
12. The method of treating a liver fluke infection in an infected mammal which comprises administering to said infected mammal a therapeutically effective liver fluke treatment amount of a compound of the formula

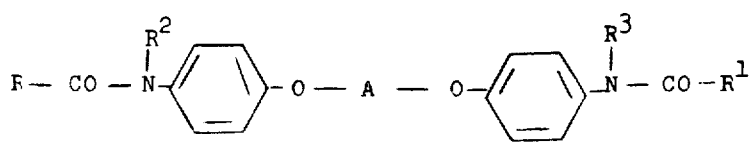

wherein R and $R^1$ are the same or different and each is selected from the class consisting of hydrogen, saturated aliphatic hydrocarbon substituted by a group selected from the class consisting of acyl of 1 to 4 carbon atoms, hydroxy, amino, N-alkylamino and N,N-dialkylamino wherein the alkyl has from 1 to 4 carbon atoms, wherein $R^2$ and $R^3$ are the same or different and each is selected from the class consisting of hydrogen and lower alkyl having from 1 to 4 carbon atoms; and wherein A is selected from the class consisting of $-CH_2-$, $-(CH_2)_2-$, $-CH_2-O-CH_2-$, and

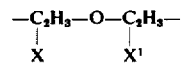

wherein X and $X^1$ are the same or different and each is selected from the class consisting of hydrogen and alkyl having 1 to 3 carbon atoms or an acid addition salt of the compound.

13. The method of claim 12 which comprises administering an acid addition salt of the compound when at least one of R and $R^1$ is substituted by a group selected from the class consisting of amino, N-alkylamino and N,N-dialkylamino.

14. The method of claim 12 wheerein the mammal is a ruminant.

15. The method of claim 13 wherein the mammal is a ruminant.

16. The method of claim 14 in which the compound is administered orally.

17. The method of claim 15 in which the compound is administered orally.

18. The method of claim 9 in which the liver flukes are of the genus Fasciola.

19. The method of claim 18 in which the mammal is a ruminant.

20. The method of claim 14 in wnich the liver flukes are of the genus Fasciola.

21. The method of claim 1 in which the compound is bis-[β-(4-acetamidophenoxy)ethyl]ether.

22. The method of claim 21 in which the compound is administered orally.

23. The method of treating a liver fluke infection in an infected ruminant which comprises administering to said infected ruminant a therapeutically effective liver fluke treatment amount of bis-[β-(4-acetamidophenoxy) ethyl]ether.

24. The method of claim 21 in which bis-[β-(4-acetamidophenoxy)ethyl]ether is administered orally.

25. The method of claim 23 which comprises administering to said ruminant bis-[β-(4-acetamidophenoxy)ethyl]ether in an amount of between 40 and 200 mg. per kilogram of ruminant bodyweight.

26. The method of claim 25 which comprises administering bis-[β-(4-acetamidophenoxy)ethyl]ether in an amount of between 60 and 100 mg. per kilogram of ruminant bodyweight.

27. The method of claim 26 which comprises administering bis-[β-(4-acetamidophenoxy)ethyl]ether in an amount of between 80 and 120 mg. per kilogram of ruminant bodyweight.

28. The method of claim 23 wherein the liver flukes are of the genus Fasciola.

29. The method of treating an infection of liver fluke of the genus Fasciola in an infected ruminant which comprises administering to said infected ruminant by the oral route bis-[β-(4-acetamidophenoxy)ethyl]ether in an amount of between 40 and 200 mg. per kilogram of ruminant bodyweight.

30. The method of treating a liver fluke infection in an infected mammal which comprises the administration and the subsequent re-administration to said infected mammal after an interval of between 4 and 8 weeks bis-[β-(4-acetamidophenoxy)ethyl]ether in an amount of between 40 and 200 mg. per kilogram of mammal bodyweight at each administration.

31. The method of claim 30 in which the mammal is a sheep or cattle.

32. The method of claim 1 in which the mammal is a sheep or cattle.

33. The method of claim 1 in which R and $R^1$ are the same or different and each is selected from the class consisting of hydrogen and saturated aliphatic hydrocarbon having 1 to 4 carbon atoms.

34. The method of claim 33 in which R and $R^1$ are the same or different and each is selected from the class consisting of hydrogen and alkyl of 1 to 4 carbon atoms.

35. The method of claim 34 in which the mammal is a sheep or cattle.

36. The method of claim 35 in which the compound is administered orally.

37. A composition for use in the treatment of liver fluke infections which comprises an effective liver fluke treatment amount of the compound of the formula

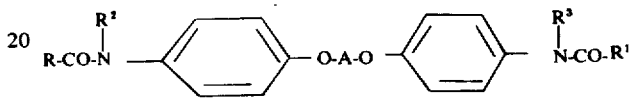

wherein R and $R^1$ are the same or different and each is selected from the class consisting of hydrogen, saturated aliphatic hydrocarbon having 1 to 7 carbon atoms, and unsaturated aliphatic hydrocarbon having 2 to 4 carbon atoms; wherein $R^2$ and $R^3$ are the same or different and each is selected from the class consisting of hydrogen and lower alkyl having 1 to 4 carbon atoms; and wherein A is selected from the class consisting of $-CH_2-, -(CH_2)_2-, -CH_2-O-CH_2-$, and

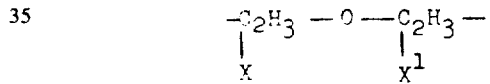

wherein X and $X^1$ are the same or different and each is selected from the class consisting of hydrogen and alkyl having 1 to 3 carbon atoms in association with pharmaceutically acceptable carrier therefor.

38. The composition according to claim 37 which is orally ingestible.

39. The composition according to claim 38 in which the composition contains .5 to 4 grams of the compound.

40. The composition of claim 37 as an aqueous suspension.

41. The composition of claim 39 as an aqueous suspension.

42. A composition for use in the treatment of liver fluke infections which comprises an effective liver fluke treatment amount of the compound of the formula

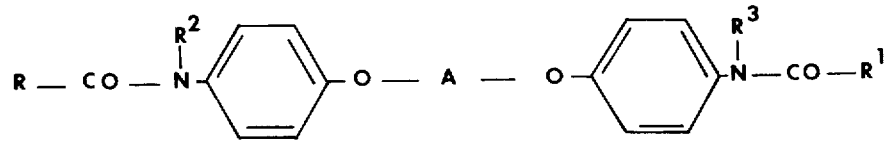

wherein R and $R^1$ are the same or different and each is selected from the class consisting of hydrogen, and saturated aliphatic hydrocarbon having 1 to 4 carbon atoms; wherein $R^2$ and $R^3$ are both hydrogen; and wherein A is

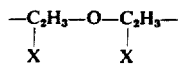

wherein X and $X^1$ are the same or different and each is selected from the class consisting of hydrogen and methyl, in association with a pharmaceutically acceptable carrier therefor.

43. The composition according to claim 37 which is orally ingestible.

44. The composition according to claim 41 in which the composition contains .5 to 4 grams of the compound.

45. The composition of claim 42 as an aqueous suspension.

46. The composition of claim 44 as an aqueous suspension.

47. The composition of claim 37 in which R and $R^1$ are hydrogen or alkyl.

48. The composition of claim 42 in which R and $R^1$ are hydrogen or alkyl.

49. A composition for use in the treatment of liver fluke infections which comprises an effective liver fluke treatment amount of the compound of the formula

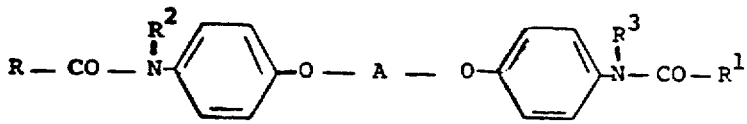

wherein R and $R^1$ are the same or different and each is selected from the class consisting of hydrogen and saturated aliphatic hydrocarbon substituted by a group selected from the class consisting of acyl of 1 to 4 carbon atoms, hydroxy, amino, N-alkylamino, and N, N-dialkylamino wherein the alkyl has 1 to 4 carbon atoms, wherein $R^2$ and $R^3$ are the same or different and each is selected from the class consisting of hydrogen and lower alkyl having 1 to 4 carbon atoms; and wherein A is selected from the class consisting of $-CH_2-$, $-(CH_2)_2-$, $-CH_2-O-CH_2-$, and

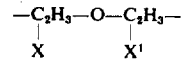

wherein X and $X^1$ are the same or different and each is selected from the class consisting of hydrogen and alkyl having 1 to 3 carbon atoms in association with a pharmaceutically acceptable carrier.

50. A composition for use in the treatment of liver fluke infections which comprises an effective liver fluke treatment amount of a compound bis-[β-(4-acetamidophenoxy) ethyl]ether in association with a pharmaceutically acceptable carrier.

51. The composition of claim 50 which is orally ingestible.

52. The composition of claim 51 which contains .5 to 4 grams of the compound.

53. The composition of claim 50 which is an aqueous suspension.

54. The composition of claim 51 which is an aqueous suspension.

55. The composition of claim 52 which is aqueous suspension.

56. The composition of claim 50 in solid form or as a paste.

57. The composition of claim 51 in solid form or as a paste.

58. The composition of claim 52 in solid form or as a paste.

* * * * *